United States Patent
Zhang et al.

(10) Patent No.: US 11,180,653 B2
(45) Date of Patent: Nov. 23, 2021

(54) RESIN COMPOSITION AND ARTICLE MADE THEREFROM

(71) Applicant: Elite Electronic Material (KunShan) Co., Ltd., Kunshan (CN)

(72) Inventors: Yan Zhang, Kunshan (CN); Jue Tan, Kunshan (CN); Rongtao Wang, Kunshan (CN); Shu-Hao Chang, Taoyuan (TW)

(73) Assignee: Elite Electronic Material (Kunshan) Co., Ltd., Kunshan (CN)

( * ) Notice: Subject to any disclaimer, the term of this patent is extended or adjusted under 35 U.S.C. 154(b) by 0 days.

(21) Appl. No.: 16/852,126

(22) Filed: Apr. 17, 2020

(65) Prior Publication Data

US 2021/0189120 A1    Jun. 24, 2021

(30) Foreign Application Priority Data

Dec. 23, 2019 (CN) .......................... 201911341666.2

(51) Int. Cl.
| | |
|---|---|
| *C08J 5/24* | (2006.01) |
| *C08L 71/12* | (2006.01) |
| *B32B 27/28* | (2006.01) |
| *C08K 5/00* | (2006.01) |

(52) U.S. Cl.
CPC .......... *C08L 71/126* (2013.01); *B32B 27/285* (2013.01); *C08J 5/24* (2013.01); *C08K 5/0025* (2013.01); *C08K 5/0066* (2013.01)

(58) Field of Classification Search
CPC ........ C08L 71/126; B32B 27/285; C08J 5/24; C08K 5/0066; C08K 5/0025
See application file for complete search history.

(56) References Cited

U.S. PATENT DOCUMENTS

| | | | | |
|---|---|---|---|---|
| 4,948,854 | A  * | 8/1990 | Amaya | .................... C08F 22/14 |
| | | | | 359/642 |
| 2001/0053830 | A1* | 12/2001 | Yokoyama | ............... G02B 1/04 |
| | | | | 526/82 |
| 2016/0145370 | A1* | 5/2016 | Kitai | .................... C08F 290/062 |
| | | | | 428/196 |
| 2017/0342200 | A1* | 11/2017 | Hong | ...................... C08F 36/20 |

* cited by examiner

*Primary Examiner* — Callie E Shosho
*Assistant Examiner* — Bethany M Miller
(74) *Attorney, Agent, or Firm* — Muncy, Geissler, Olds & Lowe, P.C.

(57) ABSTRACT

A resin composition includes a vinyl-containing polyphenylene ether resin and a prepolymer, wherein the prepolymer is prepared by prepolymerization of a mixture which at least includes a divinylbenzene, a triallyl compound and a diallyl isophthalate. An article made from the resin composition is also provided, which includes a prepreg, a resin film, a laminate or a printed circuit board. The article achieves improvements in at least one properties of glass transition temperature, copper foil peeling strength, dissipation factor, inner resin flow, melt viscosity, minimum dynamic viscosity, resin filling property in open area, and water resistance.

16 Claims, 1 Drawing Sheet

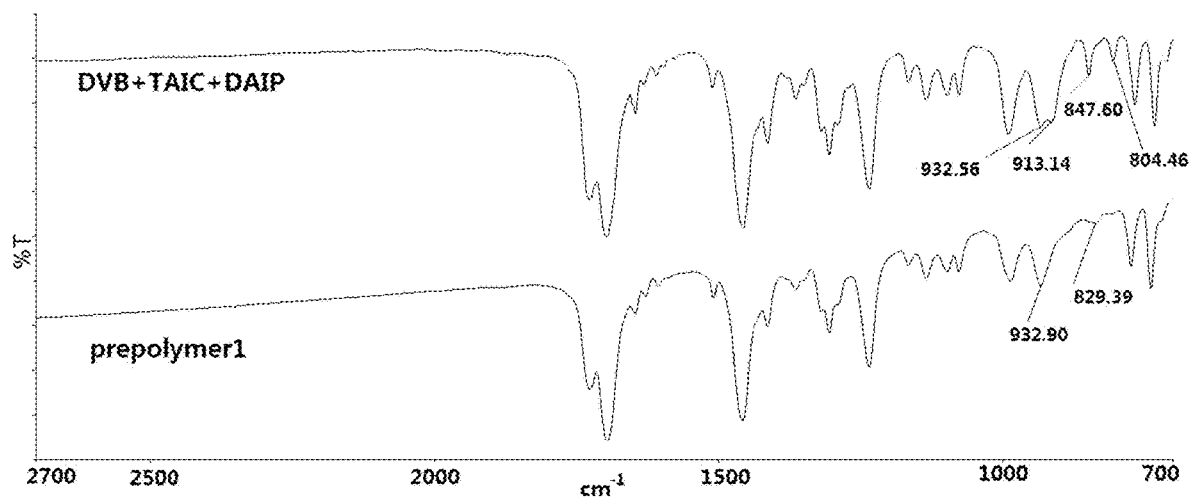

RESIN COMPOSITION AND ARTICLE MADE THEREFROM

CROSS-REFERENCE TO RELATED APPLICATION

This application claims the priority benefits of China Patent Application No. 201911341666.2, filed on Dec. 23, 2019, the entirety of which is hereby incorporated by reference herein and made a part of this specification.

BACKGROUND

1. Field of the Disclosure

The present disclosure relates to a resin composition and more particularly to a resin composition comprising a vinyl-containing polyphenylene ether resin and an article made from the resin composition, such as a prepreg, a resin film, a laminate or a printed circuit board.

2. Description of Related Art

Recently, due to the development of electronic signal transmission toward 5G, and the trend of miniaturization and high performance of semiconductor packaging widely used in electronic equipment, communication devices and personal computers, components for semiconductor packaging has become highly integrated and required high density installation. Circuit boards were developed toward multi-layer configuration, high trace interconnection density, and high speed signal transmission, thereby presenting more challenges to the overall performance of circuit laminates such as copper-clad laminates.

Conventionally, polyphenylene ether resins (a.k.a. polyphenylene oxide resins) were widely used for making low dielectric copper-clad laminates, but copper-clad laminates made solely from a polyphenylene ether resin fail to meet the demands of new generation high frequency and high performance printed circuit boards. Accordingly, there is a need to develop a material for copper-clad laminates that has better overall performance.

SUMMARY

A primary object of this disclosure is to provide a resin composition which, compared with conventional technology, achieves improvements in at least one properties of glass transition temperature, copper foil peeling strength, dissipation factor, inner resin flow, melt viscosity, minimum dynamic viscosity, resin filling property in open area, and water resistance.

To achieve the above-mentioned objects, the present disclosure provides a resin composition, comprising a vinyl-containing polyphenylene ether resin and a prepolymer, wherein the prepolymer is prepared by prepolymerization of a mixture which at least comprises a divinylbenzene, a triallyl compound and a diallyl isophthalate.

In one embodiment, the divinylbenzene may be an ortho-divinylbenzene, a para-divinylbenzene, a meta-divinylbenzene or a combination thereof.

In one embodiment, the triallyl compound comprises triallyl isocyanurate (TAIC), triallyl cyanurate (TAC) or a combination thereof.

In one embodiment, the resin composition comprises 90 parts by weight of the vinyl-containing polyphenylene ether resin and 7 to 35 parts by weight of the prepolymer.

Preferably, in one embodiment, the resin composition comprises 90 parts by weight of the vinyl-containing polyphenylene ether resin and 10 to 30 parts by weight of the prepolymer.

In one embodiment, in the mixture, the divinylbenzene, the triallyl compound and the diallyl isophthalate are present in a weight ratio of 10-20:10-20:5-15.

In one embodiment, relative to 90 parts by weight of the vinyl-containing polyphenylene ether resin, the content of the prepolymer may be 7-35 parts by weight, wherein the divinylbenzene, the triallyl compound and the diallyl isophthalate may be present in a ratio of 10:10:5, 20:10:5, 10:20:5 or 10:10:15.

In one embodiment, the mixture may further optionally comprise maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

For example, the mixture may comprise divinylbenzene, triallyl compound, diallyl isophthalate and maleimide resin.

For example, the mixture may comprise divinylbenzene, triallyl compound, diallyl isophthalate and polyolefin.

For example, the mixture may comprise divinylbenzene, triallyl compound, diallyl isophthalate and amine curing agent.

In one embodiment, the resin composition may optionally further comprise divinylbenzene, triallyl compound, di(vinylphenyl)ethane, di(vinylphenyl)hexane, diallyl isophthalate, bis(vinylphenyl) dimethyl ether, bis(vinylphenyl) dimethyl benzene, maleimide resin, cyanate ester resin, maleimide triazine resin, polyolefin resin, epoxy resin, phenolic resin, benzoxazine resin, styrene maleic anhydride resin, amine curing agent, polyester resin, polyamide resin, polyimide resin or a combination thereof.

In one embodiment, the resin composition may optionally further comprise flame retardant, curing accelerator, polymerization inhibitor, surface treating agent, coloring agent, toughening agent, solvent or a combination thereof.

The present disclosure also provides an article made from the resin composition described above, which comprises a prepreg, a resin film, a laminate or a printed circuit board.

In one embodiment, articles made from the resin composition disclosed herein have one, more or all of the following properties:
(i) a glass transition temperature as measured by using a dynamic mechanical analyzer by reference to IPC-TM-650 2.4.24.4 of greater than or equal to 196° C., preferably greater than or equal to 200° C., such as between 201° C. and 223° C.;
(ii) a copper foil peeling strength as measured by using a tensile strength tester by reference to IPC-TM-650 2.4.8 of greater than or equal to 3.51 lb/in, such as between 3.51 lb/in and 3.88 lb/in;
(iii) a dissipation factor as measured by using a microwave dielectrometer by reference to JIS C2565 at 2 GHz of greater than or equal to 0.0047, such as between 0.0047 and 0.0050;
(iv) an inner resin flow after lamination of greater than or equal to 5.00 mm, such as between 5.00 mm and 8.05 mm;
(v) a melt viscosity of less than or equal to 300 poises (abbreviated as "P"), such as between 216 and 298 poises;
(vi) a minimum dynamic viscosity of less than or equal to 400 Pa·s, such as between 223 and 384 Pa·s;
(vii) absent of void in an open area after resin filling; and
(viii) a water absorption rate as measured by reference to IPC-TM-650 2.6.2.1a of less than or equal to 0.10%, such as between 0.04% and 0.06%.

Methods for measuring the aforesaid properties will be elaborated in detail below.

BRIEF DESCRIPTION OF THE DRAWINGS

The sole FIGURE illustrates the Fourier-transform infrared (FTIR) spectroscopy of the mixture before prepolymerization including divinylbenzene (DVB), triallyl isocyanurate (TAIC) and diallyl isophthalate (DAIP) (not subject to prepolymerization) and the FTIR spectroscopy of Prepolymer 1 in the Preparation Example 1.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

Unless described in the working examples or otherwise specified, all values used for representing amount or percentage in the specification or claims are understood in all situations as they are modified by the term "about".

As used herein, the term "encompass," "comprises," "comprising," "includes," "including," "has," "having" or any other variant thereof is construed as an open-ended transitional phrase intended to cover a non-exclusive inclusion. For example, a composition or article that comprises a list of elements is not necessarily limited to only those elements but may include other elements not expressly listed or inherent to such composition or article. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that close-ended transitional phrases such as "consisting of," "composed by" and "remainder being" and partially open transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" should be understood as explicitly disclosing all subranges such as 1.0 to 7.0, 2.0 to 8.0, 2.0 to 6.0, 3.0 to 6.0, 4.0 to 8.0, 3.0 to 8.0 and so on, particularly subranges defined by integers, as well as disclosing all individual values in the range such as 1.0, 2.0, 3.0, 4.0, 5.0, 6.0, 7.0 and 8.0. Similarly, a range of "from 1.0 to 8.0" or "between 1.0 and 8.0" should be understood as explicitly disclosing all ranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the end points of the ranges. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3," it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 and/or X2 and/or X3 and Y is Y1 and/or Y2 and/or Y3.

As used herein, "or a combination thereof" means "or any combination thereof".

Unless otherwise specified, the term "resin" of the present disclosure is construed as comprising monomer, polymer or a combination thereof, but not limited thereto. A polymer refers to a chemical substance formed by one, two or more monomers via polymerization and may comprise a homopolymer, a copolymer, a prepolymer, etc., but not limited thereto. In addition, the term "polymer" includes but is not limited to an oligomer. An oligomer refers to a polymer with 2-20, typically 2-5, repeating units.

Unless otherwise specified, according to the present disclosure, a compound refers to a chemical substance formed by two or more elements bonded with chemical bonds.

Unless otherwise specified, according to the present disclosure, a resin encompasses the resin and its modification. The aforesaid modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

Unless otherwise specified, according to the present disclosure, a DOPO derivative refers to a product of a DOPO structure with its hydrogen atom on —P—H substituted by halogen, hydroxyl group, oxygen, etc. For example, a DPPO derivative refers to a product of a DPPO structure with its hydrogen atom on —P—H substituted by halogen, hydroxyl group, oxygen, etc.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

As described above, the present disclosure provides a resin composition, comprising a vinyl-containing polyphenylene ether resin and a prepolymer, wherein the prepolymer is prepared by prepolymerization of a mixture which at least comprises a divinylbenzene, a triallyl compound and a diallyl isophthalate.

As used herein, "vinyl-containing" refers to the presence of an ethylenic carbon-carbon double bond (C═C) or a functional group derived therefrom in a compound. Therefore, examples of "vinyl-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure, for example. In other words, the vinyl-containing polyphenylene ether resin described herein represents a polyphenylene ether resin containing a vinyl group, examples including but not limited to a polyphenylene ether resin containing a vinyl group, an allyl group, a vinylbenzyl group, a methacrylate group or the like.

For example, in one embodiment, the vinyl-containing polyphenylene ether resin comprises a vinylbenzyl-containing polyphenylene ether resin, a methacrylate-containing polyphenylene ether resin (i.e., methacryloyl-containing polyphenylene ether resin), an allyl-containing polyphenylene ether resin, a vinylbenzyl-modified bisphenol A polyphenylene ether resin, a chain-extended vinyl-containing polyphenylene ether resin or a combination thereof.

For example, the vinyl-containing polyphenylene ether resin may be a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-modified bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

In addition, for example, the vinyl-containing polyphenylene ether resin may comprise a structure of Formula (D):

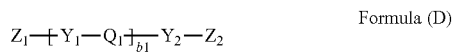

Formula (D)

wherein b1 is an integer of 0 to 10, preferably an integer of 0 to 5;

$Q_1$ comprises a structure of any one of Formula (D-1) to Formula (D-3):

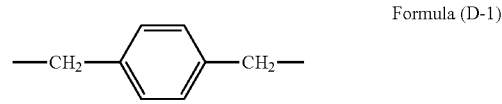

Formula (D-1)

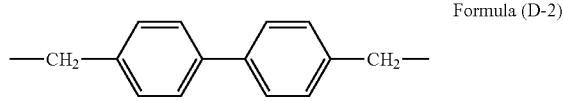

Formula (D-2)

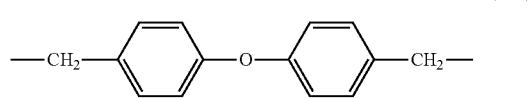

Formula (D-3)

$Y_1$ and $Y_2$ independently comprise a structure of Formula (D-4):

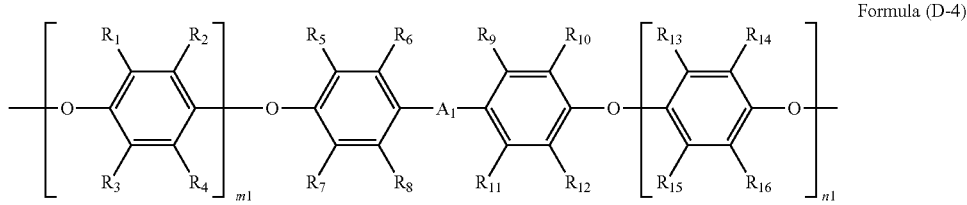

Formula (D-4)

In Formula (D-4), m1 and n1 independently represent an integer of 1 to 15, such as 1, 5, 10 or 15; $R_1$ to $R_{16}$ are independently selected from H, —$CH_3$ and a halogen atom (e.g., chlorine); $A_1$ is selected from a covalent bond, —$CH_2$—, —$CH(CH_3)$—, —$C(CH_3)_2$—, —O—, —S—, —$SO_2$— and a carbonyl group;

$Z_1$ and $Z_2$ independently comprise a structure of Formula (D-5), Formula (D-6) or Formula (D-7):

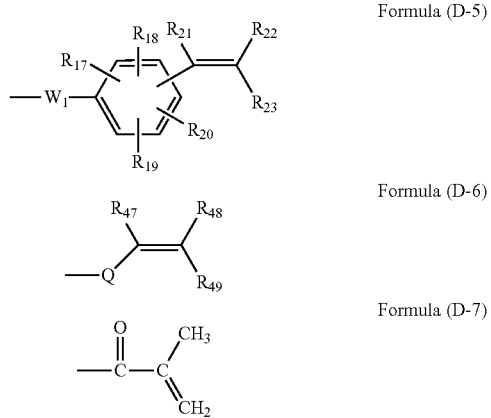

Formula (D-5)

Formula (D-6)

Formula (D-7)

In Formula (D-5), $R_{17}$ to $R_{23}$ are individually selected from H, —$CH_3$ and a halogen atom, and $W_1$ is a $C_1$-$C_3$ divalent aliphatic group, such as methylene, ethylene, or propylene. In Formula (D-6), $R_{47}$ to $R_{49}$ are individually selected from H, —$CH_3$ and a halogen atom, and Q is a $C_1$-$C_3$ divalent aliphatic group, such as methylene, ethylene, or propylene.

For example, the vinyl-containing polyphenylene ether resin may comprise a structure below:

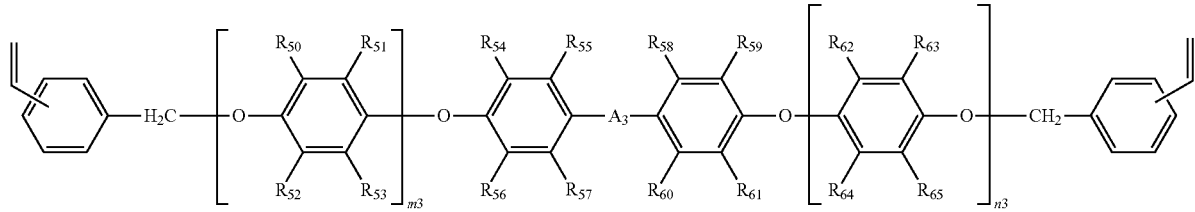

wherein m3 and n3 independently represent an integer of 1 to 15; $R_{50}$ to $R_{65}$ are independently selected from H, —$CH_3$ and a halogen atom; and $A_3$ is selected from a covalent bond, —$CH_2$—, —$CH(CH_3)$—, —$C(CH_3)_2$—, —O—, —S—, —$SO_2$— and a carbonyl group.

For example, the divinylbenzene may comprise an ortho-divinylbenzene, a meta-divinylbenzene, a para-divinylbenzene or a combination thereof, and the content of each is not particularly limited. For example, the amount of para-divinylbenzene may be 0.1-100 wt % relative to the total amount of the divinylbenzene.

In one embodiment, the resin composition comprises 90 parts by weight of the vinyl-containing polyphenylene ether resin and 7 to 35 parts by weight of the prepolymer. Preferably, in one embodiment, the resin composition comprises 90 parts by weight of the vinyl-containing polyphenylene ether resin and 10 to 30 parts by weight of the prepolymer.

According to the present disclosure, prepolymerization refers to the process of prepolymerizing one, two or more chemical substances to obtain a prepolymer. The prepolymer of the present disclosure is obtained by prepolymerizing the aforesaid mixture. In one embodiment, for example but not limited thereto, the mixture is subject to prepolymerization in the presence of a curing initiator at 60-120° C. for 2-5 hours, followed by filtration and purification to obtain the prepolymer according to the present disclosure. In at least one embodiment, any divinylbenzene described above, any triallyl compound described above and the diallyl isophthalate described above are subject to prepolymerization in the presence of a curing initiator at 60-120° C. for 2-5 hours, followed by filtration and purification to obtain the prepolymer.

The prepolymerization described in the present disclosure refers to a conversion rate of the divinylbenzene of greater than 0% and less than 100% (exclusive of 0% and 100%), a conversion rate of the triallyl compound of greater than 0% and less than 100% (exclusive of 0% and 100%), and a conversion rate of the diallyl isophthalate of greater than 0% and less than 100% (exclusive of 0% and 100%), i.e., the overall conversion rate of the divinylbenzene, the triallyl compound and the diallyl isophthalate being of greater than 0% and less than 100% (exclusive of 0% and 100%). In one embodiment, the overall conversion rate of the divinylbenzene, the triallyl compound and the diallyl isophthalate is between 10% and 90%.

In one embodiment, the mixture may further optionally comprise maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

For example, in the present disclosure, the term "maleimide resin" is construed to encompass a maleimide monomer, a maleimide polymer, a combination of maleimide monomers, a combination of maleimide polymers, and a combination of maleimide monomer(s) and maleimide polymer(s). For example, the maleimide resin refers to a compound, monomer, mixture, or polymer (including oligomer) containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenyl methane bismaleimide, 4-methyl-1,3-phenylene bismaleimide, 1,6-bismaleimide-(2,2,4-trimethyl) hexane, N-2,3-xylylmaleimide, N-2,6-xylyl maleimide, N-phenyl maleimide, maleimide resin containing aliphatic long-chain structure or a combination thereof. In addition, unless otherwise specified, the aforesaid maleimide resin of the present disclosure may also comprise a prepolymer thereof, such as a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin used herein may include products such as BMI-1000, BMI-1000H, BMI-1100, BMI-1100H, BMI-2000, BMI-2300, BMI-3000, BMI-3000H, BMI-4000H, BMI-5000, BMI-5100, BM-7000 and BMI-7000H available from Daiwakasei Industry Co., Ltd., products such as BMI-70 and BMI-80 available from K.I Chemical Industry Co., Ltd, or products such as D928, D930, D932, D934, D936, D937 and D938 available from Sichuan EM Technology Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

For example, unless otherwise specified, the maleimide triazine resin used in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. The maleimide triazine resin may be obtained by polymerizing bisphenol A cyanate ester and maleimide resin, by polymerizing bisphenol F cyanate ester and maleimide resin, by polymerizing phenol novolac cyanate ester and maleimide resin or by polymerizing dicyclopentadiene-containing cyanate ester and maleimide resin, but not limited thereto.

For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, the styrene maleic anhydride may be any styrene maleic anhydrides known in the field to which this disclosure pertains, wherein the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

For example, the epoxy resin may be any epoxy resins known in the field to which this disclosure pertains; in terms of improving the thermal resistance of the resin composition, the epoxy resin may include, but not limited to, bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, or isocyanate-modified epoxy resin. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin.

The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be selected from DOPO-containing phenolic novolac epoxy resin, DOPO-containing cresol novolac epoxy resin, DOPO-containing bisphenol-A novolac epoxy resin, and a combination thereof; the DOPO-HQ epoxy resin may be selected from DOPO-HQ-containing phenolic novolac epoxy resin, DOPO-HQ-containing cresol novolac epoxy resin, DOPO-HQ-containing bisphenol-A novolac epoxy resin, and a combination thereof.

For example, the cyanate ester resin may include any one or more cyanate ester resins useful for preparing a prepreg, a resin film, a laminate or a printed circuit board, such as a compound having an Ar—O—C≡N structure, wherein Ar may be a substituted or unsubstituted aromatic group. In terms of improving the thermal resistance of the resin composition, examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be phenol novolac cyanate ester resin, bisphenol A novolac cyanate ester resin, bisphenol F novolac cyanate ester resin or a combination thereof. For example, the cyanate ester resin may be available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy sold by Lonza.

For example, the phenolic resin may be any phenolic resins known in the field to which this disclosure pertains, including but not limited to dicyclopentadiene phenol resin, phenoxy resin or novolac resin (such as phenol novolac resin, naphthol novolac resin, biphenyl novolac resin, or a combination thereof), but not limited thereto.

For example, the benzoxazine resin may be any benzoxazine resins known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, dianiline benzoxazine resin and phenyl-modified, vinyl-modified or allyl-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) and KZH-5032 (phenyl-modified benzoxazine resin) available from Kolon Industries Inc. The dianiline benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

For example, the polyester may be any polyesters known in the field to which this disclosure pertains. Examples of the polyester include but are not limited to a dicyclopentadiene-containing polyester and a naphthalene-containing polyester. Examples include, but not limited to, HPC-8000 or HPC-8150 available from D.I.C. Corporation.

For example, the polyolefin includes but is not limited to hydroxyl-terminated hydrogenated polybutadiene, butadiene-styrene copolymer, polybutadiene, hydrogenated styrene-butadiene copolymer, styrene-ethylene-propylene copolymer, styrene-butadiene-divinylbenzene terpolymer, styrene-butadiene-maleic anhydride terpolymer, vinyl-polybutadiene-urethane oligomer, styrene-isoprene copolymer, hydrogenated styrene-isoprene copolymer, hydrogenated styrene-butadiene-divinylbenzene terpolymer, maleic anhydride-butadiene copolymer, methyl styrene copolymer or a combination thereof.

For example, the amine curing agent may be any amine curing agents known in the field to which this disclosure pertains. Examples include but are not limited to diamino diphenyl sulfone, diamino diphenyl methane, diamino diphenyl ether, diamino diphenyl sulfide, dicyandiamide or a combination thereof.

In one embodiment, the resin composition may optionally further comprise divinylbenzene, di(vinylphenyl)ethane, di(vinylphenyl)hexane, triallyl compound, diallyl isophthalate, bis(vinylphenyl) dimethyl ether, bis(vinylphenyl) dimethyl benzene, maleimide resin, cyanate ester resin, maleimide triazine resin, polyolefin resin, epoxy resin, phenolic resin, benzoxazine resin, styrene maleic anhydride resin, amine curing agent, polyester resin, polyamide resin, polyimide resin or a combination thereof.

In addition to the aforesaid components, the resin composition disclosed herein may optionally further comprise flame retardant, curing accelerator, polymerization inhibitor, surface treating agent, coloring agent, toughening agent, solvent or a combination thereof.

For example, the flame retardant may be any flame retardants known in the field to which this disclosure pertains, examples including but not limited to a phosphorus-containing flame retardant, comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate and aluminium phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

The amount of the flame retardant used herein is not particularly limited and may be, relative to 90 parts by weight of the vinyl-containing polyphenylene ether resin, such as 1 part by weight to 100 parts by weight, 10 parts by weight to 90 parts by weight, 20 parts by weight to 80 parts by weight, 30 parts by weight to 70 parts by weight, or 40 parts by weight to 60 parts by weight.

For example, the curing accelerator (including curing initiator) may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl) benzene or a combination thereof.

For example, the polymerization inhibitor may comprise, but not limited to, 1,1-diphenyl-2-picrylhydrazyl radical, methyl acrylonitrile, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof.

For example, the nitroxide-mediated radical may comprise, but not limited to, nitroxide radicals derived from cyclic hydroxylamines, such as 2,2,6,6-substituted piperidine-1-oxyl free radical, 2,2,5,5-substituted pyrrolidine-1-oxyl free radical or the like. Preferred substitutes include alkyl groups with 4 or fewer carbon atoms, such as methyl group or ethyl group. Examples of the compound containing a nitroxide radical are not limited, including such as 2,2,6,6-tetramethylpiperidine-1-oxyl free radical, 2,2,6,6-tetraethylpiperidine-1-oxyl free radical, 2,2,6,6-tetramethy-4-oxo-piperidine-1-oxyl free radical, 2,2,5,5-tetramethylpyrrolidine-1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals.

The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but is not limited to dye or pigment.

The purpose of toughening agent used herein is to improve the toughness of the resin composition. For example, the toughening agent may comprise, but not limited to, carboxyl-terminated butadiene acrylonitrile rubber (CTBN rubber), core-shell rubber, or a combination thereof.

For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

The present disclosure further provides an article made from the aforesaid resin composition, such as a prepreg, a resin film, a laminate or a printed circuit board, but not limited thereto.

The article made from the resin composition may be a prepreg, which comprises a reinforcement material and a layered structure disposed thereon. The layered structure is formed by heating the resin composition at a high temperature to a semi-cured state (B-stage). Suitable baking temperature for making the prepreg may be 80° C. to 170° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In terms of the impregnation property of the resin composition, the thermal resistance, the moisture absorption resistance and the processability of the laminate made therefrom, in one preferred embodiment, the reinforcement material can be optionally pre-treated by a surface treating agent, such as pre-treated by a silane coupling agent, to improve the processability. The prepreg may be further heated and cured to the C-stage to form an insulation layer.

The article made from the resin composition may be a resin film prepared by heating and baking to semi-cure the resin composition. The resin composition may be selectively coated on a polyethylene terephthalate film (PET film), a polyimide film (PI film), a copper foil or a resin-coated copper (RCC), followed by heating and baking to semi-cure the resin composition to form the resin film.

The article made from the resin composition may be a laminate, which comprises two metal foils and an insulation layer disposed between the metal foils, wherein the insulation layer is made by curing the resin composition at high temperature and high pressure to the C-stage, a suitable curing temperature being for example between 150° C. and 220° C. and preferably between 190° C. and 210° C. and a suitable curing time being 90 to 180 minutes and preferably 120 to 150 minutes. The insulation layer may be obtained by curing the aforesaid prepreg or resin film. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a circuit board (i.e., printed circuit board).

EXAMPLES

Examples are given below to further describe the conception and technical effects of the present disclosure to enable those skilled in the art to fully comprehend the purposes, features and effects of the present disclosure. It will be understood by those skilled in the art that these examples are exemplary only and are not intended to limit the scope of the present disclosure.

Raw materials:
OPE-2st: OPE-2st 2200, bis-vinylbenzyl-terminated polyphenylene ether resin, available from Mitsubishi Gas Chemical Co., Inc.
SA9000: bis-methacrylate-terminated polyphenylene ether resin, available from Sabic.
SA90: bis-hydroxyl-terminated polyphenylene ether resin, available from Sabic.
BMI-5100: 3,3-dimethyl-5,5'-diethyl-4,4'-diphenylmethane bismaleimide resin, available from Daiwakasei Industry Co., Ltd.
BMI-2300: phenylmethane maleimide resin, available from Daiwakasei Industry Co., Ltd.
DVB: divinylbenzene, containing more than 50% of para-divinylbenzene, available from Sigma-Aldrich.
TAIC: triallyl isocyanurate, commercially available.
DAIP: diallyl isophthalate, available from Chembridge International Corp., Ltd.
SC-2500 SMJ: spherical silica, available from Admatechs.
25B: 2,5-dimethyl-2,5-di(t-butylperoxy)-3-hexyne, available from NOF Corporation.
Toluene: commercially available.
Methyl ethyl ketone (MEK): commercially available.

Prepolymer Preparation Example 1

Under stirring, 50 parts by weight of the toluene solvent were added to 10 parts by weight of divinylbenzene (DVB), 10 parts by weight of triallyl isocyanurate resin (TAIC) and 5 parts by weight of diallyl isophthalate (DAIP), followed by adding 0.1 part by weight of peroxide (BPO) as the initiator, and the reaction was performed under continuous stirring at 90° C. for 3 hours; after the reaction was over, the solution was filtrated and purified and then cooled to obtain the Prepolymer 1. The overall conversion rate of DVB, TAIC and DAIP is between 10% and 90%.

FTIR was used to analyze the resin material before prepolymerization and the prepolymerized product. The sole FIGURE illustrates the FTIR spectroscopy of the resin material before prepolymerization and the Prepolymer 1, wherein % T represents transmittance percentage.

In the sole FIGURE, absorption peaks at 804.46 $cm^{-1}$ and 847.60 $cm^{-1}$ represent the bending vibration absorption peaks of terminal double bonds (—CH=$CH_2$) of DVB, DAIP and TAIC in the raw material mixture solution (prior to prepolymerization). The FTIR spectroscopy of the Prepolymer 1 indicates that the bending vibration absorption peaks of terminal double bonds of DVB, DAIP and TAIC were largely reduced; the vinyl bond absorption peak at 913.14 $cm^{-1}$ disappeared after the reaction, indicating the major chemical structures of the three reactants were not substantially influenced and the Prepolymer 1 was obtained.

Prepolymer Preparation Example 2

A prepolymer was prepared according to the processes described in the Prepolymer Preparation Example 1, except that 20 parts by weight of DVB, 10 parts by weight of TAIC and 5 parts by weight of DAIP were used to obtain the Prepolymer 2. The overall conversion rate of DVB, TAIC and DAIP is between 10% and 90%.

Prepolymer Preparation Example 3

A prepolymer was prepared according to the processes described in the Prepolymer Preparation Example 1, except that 10 parts by weight of DVB, 20 parts by weight of TAIC and 5 parts by weight of DAIP were used to obtain the Prepolymer 3. The overall conversion rate of DVB, TAIC and DAIP is between 10% and 90%.

Prepolymer Preparation Example 4

A prepolymer was prepared according to the processes described in the Prepolymer Preparation Example 1, except that 10 parts by weight of DVB, 10 parts by weight of TAIC and 15 parts by weight of DAIP were used to obtain the Prepolymer 4. The overall conversion rate of DVB, TAIC and DAIP is between 10% and 90%.

Prepolymer Preparation Example 5

A prepolymer was prepared according to the processes described in the Prepolymer Preparation Example 1, except that 10 parts by weight of DVB and 10 parts by weight of TAIC were used, without using DAIP, to obtain the Prepolymer 5.

Prepolymer Preparation Example 6

A prepolymer was prepared according to the processes described in the Prepolymer Preparation Example 1, except that 10 parts by weight of TAIC and 5 parts by weight of DAIP were used, without using DVB, to obtain the Prepolymer 6.

Prepolymer Preparation Example 7

A prepolymer was prepared according to the processes described in the Prepolymer Preparation Example 1, except that 10 parts by weight of DVB and 5 parts by weight of DAIP were used, without using TAIC, to obtain the Prepolymer 7.

Resin Composition Example E1

50 parts by weight of SA9000, 40 parts by weight of OPE-2st 2200 and 10 parts by weight of BMI-5100 were added to 50 parts by weight of toluene and 40 parts by weight of MEK, and mixed and stirred to fully dissolve the solid ingredients to form a homogeneous liquid state, followed by adding 20 parts by weight of the Prepolymer 1 and 50 parts by weight of SC-2500 SMJ and stirring until fully dispersed, and followed by adding 0.3 part by weight of 25B and stirring for 1 hour to obtain the resin composition E1.

According to the components and amounts listed in Table 1 to Table 4, resin compositions of Examples E2 to E9 and Comparative Examples C2 to C7 and C9 to C10 containing the prepolymer were prepared by reference to the preparation of the resin composition of Example E1. In addition, according to the ingredients and amounts listed in Table 3 to Table 4 below, resin compositions of Comparative Examples C1 and C8 not containing the prepolymer were prepared.

Compositions and test results of resin compositions of Examples and Comparative Examples are listed below (in part by weight):

TABLE 1

Resin compositions of E1-E5 (in part by weight) and test results

| Component | | E1 | E2 | E3 | E4 | E5 |
|---|---|---|---|---|---|---|
| vinyl-containing polyphenylene ether resin | OPE-2st | 40 | 40 | 40 | 40 | 40 |
| | SA9000 | 50 | 50 | 50 | 50 | 50 |
| | SA90 | — | — | — | — | — |
| | Prepolymer 1 | 20 | — | — | — | 30 |
| | Prepolymer 2 | — | 20 | — | — | — |
| | Prepolymer 3 | — | — | 20 | — | — |
| | Prepolymer 4 | — | — | — | 20 | — |
| | Prepolymer 5 | — | — | — | — | — |
| | Prepolymer 6 | — | — | — | — | — |
| | Prepolymer 7 | — | — | — | — | — |
| | DVB | — | — | — | — | — |
| | TAIC | — | — | — | — | — |
| | DAIP | — | — | — | — | — |
| maleimide resin | BMI-5100 | 10 | 10 | 10 | 10 | 10 |
| | BMI-2300 | — | — | — | — | — |
| curing initiator (25B) | | 0.3 | 0.3 | 0.3 | 0.3 | 0.3 |
| inorganic filler (SC-2500 SMJ) | | 50 | 50 | 50 | 50 | 50 |
| solvent | toluene | 50 | 50 | 50 | 50 | 50 |
| | methyl ethyl ketone | 40 | 40 | 40 | 40 | 40 |

| Property | Unit | E1 | E2 | E3 | E4 | E5 |
|---|---|---|---|---|---|---|
| DMA Tg | °C. | 210 | 213 | 208 | 201 | 202 |
| P/S | lb/in | 3.69 | 3.64 | 3.59 | 3.51 | 3.56 |
| Df@2 GHz | / | 0.0048 | 0.0048 | 0.0049 | 0.0048 | 0.0047 |
| inner resin flow | mm | 6.46 | 6.04 | 7.09 | 8.05 | 6.92 |
| melt viscosity | P | 268 | 288 | 255 | 216 | 258 |
| minimum dynamic viscosity | Pa·s | 310 | 365 | 288 | 223 | 299 |
| resin filling property | number of void | 0, OK | 0, OK | 0, OK | 0, OK | 0, OK |
| water absorption rate | % | 0.05 | 0.06 | 0.05 | 0.04 | 0.06 |

TABLE 2

Resin compositions of E6-E9 (in part by weight) and test results

| Component | | E6 | E7 | E8 | E9 |
|---|---|---|---|---|---|
| vinyl-containing polyphenylene ether resin | OPE-2st | 40 | 40 | 40 | 60 |
| | SA9000 | 50 | 50 | 50 | 30 |
| | SA90 | — | — | — | — |
| | Prepolymer 1 | 10 | 35 | 7 | 10 |
| | Prepolymer 2 | — | — | — | 5 |
| | Prepolymer 3 | — | — | — | — |
| | Prepolymer 4 | — | — | — | 5 |
| | Prepolymer 5 | — | — | — | — |
| | Prepolymer 6 | — | — | — | — |
| | Prepolymer 7 | — | — | — | — |
| | DVB | — | — | — | — |
| | TAIC | — | — | — | — |
| | DAIP | — | — | — | — |
| maleimide resin | BMI-5100 | 10 | 10 | 10 | 10 |
| | BMI-2300 | — | — | — | 2 |
| curing initiator (25B) | | 0.3 | 0.3 | 0.3 | 0.3 |
| inorganic filler (SC-2500 SMJ) | | 50 | 50 | 50 | 45 |
| solvent | toluene | 50 | 50 | 50 | 60 |
| | methyl ethyl ketone | 40 | 40 | 40 | 50 |

| Property | Unit | E6 | E7 | E8 | E9 |
|---|---|---|---|---|---|
| DMA Tg | °C. | 216 | 196 | 218 | 223 |
| P/S | lb/in | 3.75 | 3.51 | 3.88 | 3.82 |
| Df@2 GHz | / | 0.0049 | 0.0047 | 0.0049 | 0.0050 |
| inner resin flow | mm | 5.11 | 7.33 | 3.94 | 5.15 |
| melt viscosity | P | 298 | 236 | 356 | 290 |
| minimum dynamic viscosity | Pa·s | 384 | 273 | 483 | 371 |
| resin filling property | number of void | 0, OK | 0, OK | 83, NG | 0, OK |
| water absorption rate | % | 0.04 | 0.05 | 0.05 | 0.06 |

TABLE 3

Resin compositions of C1-C5 (in part by weight) and test results

| Component | | C1 | C2 | C3 | C4 | C5 |
|---|---|---|---|---|---|---|
| vinyl-containing polyphenylene ether resin | OPE-2st | 40 | 40 | 40 | 40 | 40 |
| | SA9000 | 50 | 50 | 50 | 50 | 50 |
| | SA90 | — | — | — | — | — |
| | Prepolymer 1 | — | — | — | — | — |
| | Prepolymer 2 | — | — | — | — | — |
| | Prepolymer 3 | — | — | — | — | — |
| | Prepolymer 4 | — | — | — | — | — |
| | Prepolymer 5 | — | 20 | — | — | 16 |
| | Prepolymer 6 | — | — | 20 | — | — |
| | Prepolymer 7 | — | — | — | 20 | — |
| | DVB | 8 | — | — | — | — |
| | TAIC | 8 | — | — | — | — |
| | DAIP | 4 | — | — | — | 4 |
| maleimide resin (BMI-5100) | | 10 | 10 | 10 | 10 | 10 |
| curing initiator (25B) | | 0.3 | 0.3 | 0.3 | 0.3 | 0.3 |
| inorganic filler (SC-2500SMJ) | | 50 | 50 | 50 | 50 | 50 |
| solvent | toluene | 50 | 50 | 50 | 50 | 50 |
| | methyl ethyl ketone | 40 | 40 | 40 | 40 | 40 |

| Property | Unit | C1 | C2 | C3 | C4 | C5 |
|---|---|---|---|---|---|---|
| DMA Tg | °C. | 212 | 218 | 209 | 208 | 205 |
| P/S | lb/in | 3.45 | 3.84 | 3.62 | 3.19 | 3.30 |
| Df@2 GHz | / | 0.0055 | 0.0055 | 0.0054 | 0.0050 | 0.0051 |
| inner resin flow | mm | 6.31 | 4.72 | 7.22 | 6.36 | 6.55 |
| melt viscosity | P | 280 | 333 | 246 | 245 | 257 |
| minimum dynamic viscosity | Pa·s | 336 | 439 | 276 | 270 | 284 |
| resin filling property | number of void | 0, OK | 56, NG | 0, OK | 0, OK | 0, OK |
| water absorption rate | % | 0.15 | 0.16 | 0.14 | 0.16 | 0.17 |

TABLE 4

Resin compositions of C6-C10 (in part by weight) and test results

| Component | | C6 | C7 | C8 | C9 | C10 |
|---|---|---|---|---|---|---|
| vinyl-containing polyphenylene ether resin | OPE-2st | 40 | 40 | 40 | 40 | — |
| | SA9000 | 50 | 50 | 50 | — | — |
| | SA90 | — | — | — | 50 | 90 |
| | Prepolymer 1 | — | — | — | 20 | 20 |
| | Prepolymer 2 | — | — | — | — | — |
| | Prepolymer 3 | — | — | — | — | — |
| | Prepolymer 4 | — | — | — | — | — |
| | Prepolymer 5 | — | — | — | — | — |
| | Prepolymer 6 | 12 | — | — | — | — |
| | Prepolymer 7 | — | 12 | — | — | — |
| | DVB | 8 | — | — | — | — |
| | TAIC | — | 8 | — | — | — |
| | DAIP | — | — | — | — | — |
| maleimide resin (BMI-5100) | | 10 | 10 | 10 | 10 | 10 |
| curing initiator (25B) | | 0.3 | 0.3 | 0.3 | 0.3 | 0.3 |
| inorganic filler (SC-2500SMJ) | | 50 | 50 | 50 | 50 | 50 |
| solvent | toluene | 50 | 50 | 50 | 50 | 50 |
| | methyl ethyl ketone | 40 | 40 | 40 | 40 | 40 |

| Property | Unit | C6 | C7 | C8 | C9 | C10 |
|---|---|---|---|---|---|---|
| DMA Tg | °C. | 212 | 208 | 218 | 198 | 186 |
| P/S | lb/in | 3.65 | 3.51 | 3.84 | 3.77 | 3.71 |
| Df@2 GHz | / | 0.0055 | 0.0057 | 0.0058 | 0.0065 | 0.0075 |
| inner resin flow | mm | 6.38 | 6.86 | 3.11 | 6.98 | 7.22 |
| melt viscosity | P | 249 | 233 | 428 | 235 | 227 |
| minimum dynamic viscosity | Pa·s | 280 | 265 | 616 | 264 | 248 |
| resin filling property | number of void | 0, OK | 0, OK | 181, NG | 0, OK | 0, OK |
| water absorption rate | % | 0.16 | 0.15 | 0.13 | 0.19 | 0.18 |

Prepreg

Resin compositions from different Examples (E1 to E9) and Comparative Examples (C1 to C10) listed in Table 1 to Table 4 were respectively added to a stirred tank, well mixed and fully dissolved as varnishes and then added to an impregnation tank. A fiberglass fabric (e.g., 1080 E-glass fiber fabric or 2116 E-glass fiber fabric) was immersed into the impregnation tank to adhere the resin composition on the fiberglass fabric, followed by heating at 120° C. to 150° C. to the semi-cured state (B-Stage) to obtain the prepreg, wherein the prepreg made from 2116 E-glass fiber fabric has a resin content of about 55% by weight, and the prepreg made from 1080 E-glass fiber fabric has a resin content of about 70% by weight.

Copper-Clad Laminate (Obtained by Laminating Two Prepregs)

Two 18 μm RTF (reverse treatment foil) copper foils and two prepregs obtained from each resin composition (prepared by using 1080 E-glass fiber fabrics and having a resin content of about 70% by weight) were prepared and stacked in the order of one copper foil, two prepregs and one copper foil, followed by lamination under vacuum at 200° C. for 2 hours to form each copper-clad laminate, wherein the insulating layers were formed by curing (C-stage) two sheets of prepreg between the two copper foils, and the resin content of the insulating layers is about 70% by weight.

Copper-free laminate (obtained by laminating two prepregs) Each copper-clad laminate obtained by laminating two prepregs was etched to remove the two copper foils to obtain a copper-free laminate containing each resin composition made from laminating two prepregs and having a resin content of about 70% by weight.

Copper-clad laminate (obtained by laminating eight prepregs) Two 18 μm RTF (reverse treatment foil) copper foils and eight prepregs obtained from each resin composition (prepared by using 2116 E-glass fiber fabrics and having a resin content of about 55% by weight) were prepared and stacked in the order of one copper foil, eight prepregs and one copper foil, followed by lamination under vacuum at 200° C. for 2 hours to form the copper-clad laminate containing each resin composition, wherein the insulating layers were formed by curing (C-stage) eight sheets of prepreg between the two copper foils, and the resin content of the insulating layers is about 55% by weight.

Copper-free laminate (obtained by laminating eight prepregs) Each copper-clad laminate obtained by laminating eight prepregs was etched to remove the two copper foils to obtain a copper-free laminate containing each resin composition made from laminating eight prepregs and having a resin content of about 55% by weight.

Test items and test methods are described below.

Glass Transition Temperature (Tg)

A copper-free laminate sample (obtained by laminating eight prepregs) was subject to the glass transition temperature measurement. An dynamic mechanical analysis (DMA) was performed by reference to the method described in IPC-TM-650 2.4.24.4, during which each sample was heated from 35° C. to 300° C. at a heating rate of 2° C./minute and then subject to the measurement of glass transition temperature (DMA Tg, in °C.); a higher glass transition temperature is more preferred.

Copper Foil Peeling Strength (a.k.a. Peeling Strength, P/S)

The copper-clad laminate (obtained by laminating eight prepregs) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer. In the present technical field, under a 10 GHz frequency, for a copper-clad laminate with a dissipation factor of about or less than 0.0050, a difference in copper foil peeling strength of greater than 0.1 lb/in represents a significant difference.

Dissipation Factor (Df)

The aforesaid copper-free laminate (obtained by laminating two prepregs made from 1080 E-glass fiber fabric) sample was subject to dissipation factor measurement. Each sample was measured by using a microwave dielectrometer (available from AET Corp.) at 2 GHz frequency by reference to JIS C2565 at room temperature of 25° C. and 65% relative humidity. Lower dissipation factor represents better dielectric properties of the sample. Under a 2 GHz frequency, for a dissipation factor of less than or equal to 0.0050, a difference in Df of less than 0.0001 represents no significant difference in dissipation factor in different laminates, and a difference in Df of greater than or equal to 0.0001 represents a significant difference (i.e., significant technical difficulty) in dissipation factor in different laminates.

Inner Resin Flow

First, an EM-827 copper-containing laminate having a thickness of 28 mil (available from Elite Material Co., Ltd., using 7628 E-glass fiber fabric and 1-ounce HTE copper foil) was subject to a conventional brown oxidation treatment process to obtain a brown oxide treated core.

A prepreg (using 2116 E-glass fiber fabric, resin content of about 55% by weight, 2.5 mil in thickness, 17 inch*15 inch in size) prepared from each Example (E1 to E9) and each Comparative Example (C1 to C10) was prepared batchwise, wherein the center of the prepreg was a 4 inch*4 inch rhombus opening formed by a conventional punching machine. A piece of 0.5-ounce HTE copper foil (in reverse position, i.e., in contact with the prepreg with its smooth surface), a prepreg and a brown oxide treated core (28 mil in thickness, 18 inch*16 inch in size) were superimposed in such order, followed by lamination and curing for 2 hours under vacuum at high temperature (200° C.) and high pressure (360 psi) to obtain a copper-containing multi-layer board. The surface copper foil in reverse position of the copper-containing multi-layer board was removed to obtain a sample for inner resin flow test. Each side of the 4 inch*4 inch rhombus shape of the sample for inner resin flow test was divided into four equal sections, and the resin flow (i.e., vertical distance of resin flow) of each of the twelve points was measured to calculate the average of resin flow at the twelve points and to provide the inner resin flow (as an average) represented in mm. A difference in inner resin flow of 1 mm or greater represents a significant difference.

Melt Viscosity

About 0.15±0.01 g of powder collected from rubbing a prepreg (prepared by using 2116 E-glass fiber fabric and having a resin content of about 55% by weight) was tested by using a high shear force plate viscometer (CPD8MSVHT, available from Chuan Hua Precision Corporation) at a temperature of 175° C. and level 2 rotation speed (Speed: 11.7), so as to obtain the average of two lowest viscosity points as the melt viscosity (unit: poise, P).

Minimum Dynamic Viscosity

About 2±0.05 g of powder collected from rubbing a prepreg (prepared by using 2116 E-glass fiber fabric and having a resin content of about 55% by weight) was poured into a tablet mold and shaped as a tablet sample by using a manual tableting press with a 1 psi pressure, and then the sample was measured by using a capillary rheometer (CFT-100D, available from Sanpany Instruments Co., Ltd.) with a pressure of 4 kgf and a temperature increase rate of 2° C./minute in a temperature range of 60 to 160° C., wherein the lowest viscosity value was chosen and referred to as the minimum dynamic viscosity (in Pa·s).

Resin Filling Property in Open Area

A copper-containing laminate which has 1-ounce copper foils and an insulation layer of 2.5 mil in thickness was subject to a conventional brown oxidation process to make a brown oxide treated wiring laminate as the inner layer used to evaluate the capability of resin flowing to and filling the open area between traces during prepreg lamination. The varnish of the resin composition from each Example or each Comparative Example was used to impregnate a 1027 E-glass fiber fabric and then baked at 140° C. for 4 minutes to obtain a prepreg with a resin content of about 70% by weight. The brown oxide treated wiring laminate with a 2.5 mil insulation layer was covered on both sides with the aforesaid prepreg (obtained by impregnating a 1027 E-glass fiber fabric with the resin composition from each Example or each Comparative Example), and then the outermost layers were respectively covered with a 18 μm HVLP (hyper very low profile) copper foil. Lamination was performed for 2 hours by using a vacuum laminator at 450 psi and 200° C. to form an inner layer wiring laminate with surface copper, and then the outermost copper foils were removed by etching to obtain an inner layer wiring laminate without surface copper and having an open area of 15 mm*20 mm in size. The copper-free surface of the inner layer wiring laminate without surface copper was examined with naked eyes or by sectioning to determine whether void exists and calculate the total amount of void, wherein "OK" represents absence of void and "NG" represents presence of void.

Water Resistance

By reference to IPC-TM-650 2.6.2.1a, a 2 inch*2 inch copper-free laminate obtained by laminating eight prepregs was placed in a 105±10° C. oven and baked for 1 hour, then cooled at room temperature (about 25° C.) for 10 minutes and weighed to give a weight value $W_1$ representing the weight of the copper-free laminate; then the laminate sample was immersed and soaked in pure water at room temperature for 24 hours, then removed from the pure water and wiped to remove residual water on the surface, and the sample was weighed to give a weight value $W_2$ representing the weight of the copper-free laminate after water absorption. The water absorption rate was calculated as follow:

water absorption rate (%)=(($W_2-W_1$)/$W_1$)*100%, wherein lower water absorption rate indicates better water resistance.

The following observations can be made according to the test results above.

Example E1 (containing a prepolymer), compared with Comparative Example C1 (not containing a prepolymer), achieves a peeling strength of greater than or equal to 3.50 lb/in, a dissipation factor of less than or equal to 0.0050 and a water absorption rate of less than or equal to 0.10%. In contrast, Comparative Example C1 fails to achieve the above-mentioned effects.

Examples E1-E4 (containing the prepolymer of DVB+TAIC+DAIP), compared with Comparative Examples C2-C4 (not containing the prepolymer of DVB+TAIC+DAIP), achieve a water absorption rate of less than or equal to 0.10%. In contrast, Comparative Examples C2-C4 fail to achieve the above-mentioned effect.

Examples E1-E4 (containing the prepolymer of DVB+TAIC+DAIP), compared with Comparative Examples C5-C7 (not containing the prepolymer of DVB+TAIC+DAIP), achieve a water absorption rate of less than or equal to 0.10%. In contrast, Comparative Examples C5-C7 fail to achieve the above-mentioned effect.

Examples E1-E4 (containing a prepolymer), compared with Comparative Example C8 (not containing a prepolymer and not containing DVB, TAIC and DAIP), achieve a dissipation factor of less than or equal to 0.0050, an inner resin flow of greater than or equal to 5.00 mm, a melt viscosity of less than or equal to 300 P, a minimum dynamic viscosity of less than or equal to 400 Pa·s, absence of void in an open area after resin filling, and a water absorption rate of less than or equal to 0.10%. In contrast, Comparative Example C8 fails to achieve the above-mentioned effects.

Example E1 (containing a vinyl-containing polyphenylene ether), compared with Comparative Examples C9-C10 (not containing a vinyl-containing polyphenylene ether), achieves a glass transition temperature of greater than or equal to 200° C., a dissipation factor of less than or equal to 0.0050 and a water absorption rate of less than or equal to 0.10%. In contrast, Comparative Examples C9-C10 fail to achieve the above-mentioned effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should be also appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition comprising a vinyl-containing polyphenylene ether resin and a prepolymer, wherein the prepolymer is prepared by prepolymerization of a mixture which at least comprises a divinylbenzene, a triallyl compound and a diallyl isophthalate.

2. The resin composition of claim 1, wherein the vinyl-containing polyphenylene ether resin comprises a vinylbenzyl-containing polyphenylene ether resin, a methacrylate-containing polyphenylene ether resin, an allyl-containing polyphenylene ether resin, a vinylbenzyl-modified bisphenol A polyphenylene ether resin, a chain-extended vinyl-containing polyphenylene ether resin or a combination thereof.

3. The resin composition of claim 1, wherein the triallyl compound comprises triallyl isocyanurate, triallyl cyanurate or a combination thereof.

4. The resin composition of claim 1, comprising 90 parts by weight of the vinyl-containing polyphenylene ether resin and 7 to 35 parts by weight of the prepolymer.

5. The resin composition of claim 1, comprising 90 parts by weight of the vinyl-containing polyphenylene ether resin and 10 to 30 parts by weight of the prepolymer.

6. The resin composition of claim 1, wherein the divinylbenzene, the triallyl compound and the diallyl isophthalate are present in a weight ratio of 10-20:10-20:5-15.

7. The resin composition of claim 1, wherein the mixture further comprises maleimide resin, styrene maleic anhydride, 1,2,4-trivinyl cyclohexane, styrene, polyolefin, epoxy resin, cyanate ester resin, maleimide triazine resin, phenolic resin, benzoxazine resin, polyester resin, amine curing agent or a combination thereof.

8. The resin composition of claim 1, further comprising divinylbenzene, triallyl compound, di(vinylphenyl)ethane, di(vinylphenyl)hexane, diallyl isophthalate, bis(vinylphenyl) dimethyl ether, bis(vinylphenyl) dimethyl benzene, maleimide resin, cyanate ester resin, maleimide triazine resin, polyolefin resin, epoxy resin, phenolic resin, benzoxazine resin, styrene maleic anhydride resin, amine curing agent, polyester resin, polyamide resin, polyimide resin or a combination thereof.

9. The resin composition of claim 1, further comprising flame retardant, curing accelerator, polymerization inhibitor, surface treating agent, coloring agent, toughening agent, solvent or a combination thereof.

10. An article made from the resin composition of claim 1, wherein the article comprises a prepreg, a resin film, a laminate or a printed circuit board.

11. The article of claim 10, having a water absorption rate as measured by reference to IPC-TM-650 2.6.2.1a of less than or equal to 0.10%.

12. The article of claim 10, having a glass transition temperature as measured by using a dynamic mechanical analyzer by reference to IPC-TM-650 2.4.24.4 of greater than or equal to 196° C.

13. The article of claim 10, having an inner resin flow after lamination of greater than or equal to 5.00 mm.

14. The article of claim 10, having a melt viscosity of less than or equal to 300 poises.

15. The article of claim 10, having a minimum dynamic viscosity of less than or equal to 400 Pa·s.

16. The article of claim 10, characterized by absence of void in an open area after resin filling.

* * * * *